United States Patent
Kunze

(10) Patent No.: US 10,378,942 B2
(45) Date of Patent: Aug. 13, 2019

(54) METHOD FOR OPERATING A CORIOLIS MASS FLOWMETER AND CORRESPONDING CORIOLIS MASS FLOWMETER

(71) Applicant: KROHNE Messtechnik GmbH, Duisburg (DE)

(72) Inventor: Johannes Kunze, Bochum (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 59 days.

(21) Appl. No.: 15/410,269

(22) Filed: Jan. 19, 2017

(65) Prior Publication Data

US 2017/0205263 A1    Jul. 20, 2017

(30) Foreign Application Priority Data

Jan. 20, 2016    (DE) .................. 10 2016 100 952

(51) Int. Cl.
   *G01F 1/84*    (2006.01)

(52) U.S. Cl.
   CPC ............ *G01F 1/849* (2013.01); *G01F 1/8413* (2013.01); *G01F 1/8431* (2013.01); *G01F 1/8436* (2013.01)

(58) Field of Classification Search
   CPC ...... G01F 1/849; G01F 1/8468; G01F 1/8413; G01F 1/8431; G01F 1/8436
   See application file for complete search history.

(56) References Cited

U.S. PATENT DOCUMENTS

| | | | |
|---|---|---|---|
| 4,801,897 A | 1/1989 | Flecken | |
| 5,020,380 A | 6/1991 | Keita | |
| 6,092,409 A * | 7/2000 | Patten | G01F 1/8413 702/100 |
| 8,396,674 B2 | 3/2013 | Gebhardt et al. | |
| 9,207,212 B2 | 12/2015 | Kolahi et al. | |
| 2008/0011101 A1* | 1/2008 | Storm | G01F 1/74 73/861.356 |
| 2011/0185822 A1* | 8/2011 | Hays | G01F 1/8413 73/861.356 |
| 2013/0338943 A1 | 12/2013 | Kolahi et al. | |
| 2015/0219600 A1 | 8/2015 | Kolahi et al. | |

FOREIGN PATENT DOCUMENTS

WO    WO 2013189586 A1 * 12/2013 ........... G01F 1/8422

* cited by examiner

*Primary Examiner* — Jill E Culler
*Assistant Examiner* — Leo T Hinze
(74) *Attorney, Agent, or Firm* — David S. Safran; Roberts Mlotkowski Safran Cole & Calderon, P.C.

(57) ABSTRACT

A method for operating a Coriolis mass flowmeter having at least one controller, at least one electric actuating device, at least one electromagnetic driving mechanism with a drive coil as oscillation generator, at least one measuring tube and at least one oscillation sensor involves excited oscillation of the measuring tube being detected by the oscillation sensor and emitted as at least one output signal and the electric actuating device causing the electromagnetic driving mechanism to produce oscillation of the measuring tube largely in resonance by the output signal of the oscillation sensor, the drive voltage at the drive coil, and phasing of the drive current in relation to the phasing of the output signal of the oscillation sensor being determined and a new target phasing for the drive voltage derived from the determinations and supplied to the controller to generate a drive voltage with the new target phasing.

5 Claims, 3 Drawing Sheets

METHOD FOR OPERATING A CORIOLIS MASS FLOWMETER AND CORRESPONDING CORIOLIS MASS FLOWMETER

BACKGROUND OF THE INVENTION

Field of the Invention

The invention relates to a method for operating a Coriolis mass flowmeter having at least one controller, at least one electric actuating device, at least one electromagnetic driving mechanism with a drive coil as oscillation generator, at least one measuring tube and at least one oscillation sensor, wherein the controller generates a controller output signal for controlling the electric actuating device, the electric actuating device provides an electric excitation signal for exciting the electromagnetic drive mechanism, the electromagnetic drive mechanism excites the measuring tube to oscillation in at least one eigenform and wherein the excited oscillation of the measuring tube is detected by the oscillation sensor and emitted as at least one output signal, wherein the electric actuating device impinges the drive coil of the electromagnetic driving mechanism with a drive voltage and a drive current so that the oscillation of the measuring tube occurs largely in resonance. The invention further relates to a Coriolis mass flowmeter that carries out such a method during operation.

Description of Related Art

The above method for operating a Coriolis mass flowmeter and corresponding Coriolis mass flowmeter have been known for years, for example, from German Patent Application DE 10 2012 011 932 A1 and corresponding U.S. Patent Application Publication 2015/0219600 A1. Overall, they belong to the class of resonance systems, to which density meters or level meters using the tuning fork principle, quartz scales and band viscometers also belong. These resonance measuring systems are linked with a process, wherein the process- and resonance measuring systems alternately influence one another. In such systems, information about the process variable (measurement variable) to be determined is encrypted in the eigenfrequencies. Normally, in such systems, the working point is set at the eigenfrequency of the measuring system. In Coriolis mass flowmeters, the measuring tube corresponds to the oscillation element of the resonance measuring system.

Resonance measuring systems designed as Coriolis mass flowmeters are used, primarily in industrial process measuring technology, where mass flows have to be determined with high accuracy. The operating principle of Coriolis mass flowmeters is based on at least one measuring tube with medium flowing through it—the oscillation element—being excited to oscillation by an oscillation generator, wherein this oscillation generator is accordingly an electromagnetic driving mechanism with a drive coil. The coil normally has electric current running through it, wherein an action of force on the oscillation element, i.e., the measuring tube, is directly related to the coil current; the action of force is mostly achieved and conveyed by means of a permanent magnet movably located in the drive coil.

In Coriolis mass flowmeters, the operating principle is based on the medium having mass affecting the walls of the measuring tube due to the Coriolis force caused by the two orthogonal movements—that of the flow and that of the measuring tube. This retroactive effect of the medium on the measuring tube leads to a change of the measuring tube oscillation compared to the oscillation state of the measuring tube without flow. By detecting these characteristics of the oscillations of the Coriolis measuring tube with flow, the mass flow through the measuring tube can be determined with greater accuracy.

The eigenfrequencies of the Coriolis mass flowmeter are of particular importance, essentially the eigenfrequencies of the measuring tube as oscillation element, since the working point of the Coriolis mass flowmeter is normally set at the eigenfrequency of the measuring tube in order to be able to imprint the necessary oscillation for the induction of the Coriolis forces with a minimum energy requirement. This is what is meant when it is mentioned that the oscillations of the measuring tube occurs largely in resonance. The oscillation carried out by the measuring tube then has a certain form, which is called the eigenform of the respective excitation.

It is known from the prior art, that, in order to excite the oscillation element, a harmonic base signal is generated by the controller as a controller output signal in the form of a sinusoidal voltage and this sinusoidal voltage controls the electric actuating device—and thus the drive coil—, wherein the electric actuating device has the task of providing a corresponding power at its output in order to be able to actuate the electromagnetic driving mechanism in a suitable manner and with sufficient power. The electric actuating device is thus functionally the power-related link between the controller and the electromagnetic driving mechanism of the Coriolis mass flowmeter.

The controller is used for operating the measuring tube as an oscillation element in resonance, which is why it has to be determined whether the input variable and the output variable of the Coriolis mass flowmeter or, respectively, the measuring tube, exhibit the phase difference corresponding to the resonance. In the Coriolis mass flowmeter, on the input side, this is the force, with which the measuring tube is excited to oscillation; and, on the output side, the speed of the measuring tube, i.e., the temporal change of the deflection of the measuring tube. Based on the circumstances forming the basis of the oscillation-capable system, the resonance is present in an eigenform of the movement when, on the input side, the force effect and, on the output side, the measuring tube speed has a phase difference of 0°. If this phase stipulation is met, the desired resonance is present. For this reason, the controller is arranged in a control loop, which overall—at least also—is designed as a phase locked loop.

In the prior art, Coriolis mass flowmeters often have either a device for voltage imprinting or a device for current imprinting as the electric actuation device in the electromagnetic driving mechanism with a drive coil. The current imprinting in the electromagnetic driving mechanism having one coil inevitably leads to too high and noisy voltages at the drive coil, since the steps in the controller output signal—and even if these are only caused by the quantization stages of a digital/analog converter—occur as steps in current by the electromagnetic driving mechanism and are differentiated there by the drive coil; this is valid, in particular, for actuating devices having a high slew rate of the current. This is a problem in view of the electromagnetic compatibility and also leads to a decrease of the signal-to-noise ratio and thus to an increase of the measuring uncertainty in the measurement of different process variables and in the determination of different parameters of the resonance-measuring system, in the case of the present Coriolis mass flowmeter, i.e., for example, the stiffness of the measuring tube. Some of the known methods require exact knowledge of the parameters of the drive coil for implementing phase control, i.e., for example, the ohmic resistance $R_S$ and the inductance of the coil $L_S$.

SUMMARY OF THE INVENTION

The object of the present invention is to provide a method for operating a Coriolis mass flowmeter that allows for a fast and reliable start-up, holding and updating of a resonance point as working point of the Coriolis mass flowmeter.

The method according to the invention for operating a Coriolis mass flowmeter, in which the above derived and described object is achieved, is initially and essentially characterized in that, for achieving resonance operation, the output signal of the oscillation sensor is determined, the drive voltage at the drive coil is determined, the phasing of the drive current in relation to the phasing of the output signal of the oscillation sensor is determined and a new target phasing for the drive voltage is derived from the determined quantities and supplied to the controller so that the controller generates a drive voltage with the determined new target phasing via the electric actuating device.

The proposed method is exceptionally advantageous because it uses variables that are very easy to determine using measuring technology, such as the output signal of the oscillation sensor—which can be assumed as known, since this signal is required for determining the mass flow anyway—or also the drive voltage at the drive coil, which is known per se, since it is generated by the controller output signal—furthermore, it can also be very easily derived using measuring technology. The drive current through the drive coil is also easy to determine, for example, using a very low measuring resistance, wherein the voltage drop there is used as measuring signal.

The transfer behavior of the Coriolis mass flowmeter is—as in all physical systems—described in the sense of control technology using the relation of the output variable and the input variable causing the output variable. In the case of Coriolis mass flowmeters, this is, on the one hand, the force of the electromagnetic drive on the measuring tube, and on the other hand, the deflection speed of the measuring tube at the measuring points. In resonance, there is no phase difference between the course of the application of force and the speed of the measuring tube, i.e., the first time derivative of the measuring tube deflection.

In an electromagnetic drive with a drive coil, the exerted force behaves proportional to the current through the drive coil, which is the reason for the detection of the drive current $i_{dr}$ through the drive coil. The detection of the deflection of the measuring tube is normally implemented by oscillation sensors, which operate using a measuring coil and a permanent magnet moving within it, the permanent magnet being deflected by the measuring tube and inducing a voltage in the measuring coil. The measuring tube speed, i.e., the first derivative of the measuring tube deflection, behaves proportionally to the induced voltage in such an oscillation sensor. Insofar, it is understandable why it is useful to also detect the output signal $u_s$ of the oscillation sensor.

If these variables are provided, it is easily possible to also determine the phasing $\varphi_{idr}$ of the drive current $i_{dr}$ compared to the phasing $\varphi_s$ of the output signal $u_s$ of the oscillation sensor. If this phasing is known, the actual phasing of interest between the excitation force F on the measuring tube and the reaction variable of the measuring tube speed is also known. This relative phasing or, respectively, the phase difference between these variables must be regulated to zero for the resonance case.

In an advantageous implementation of the proposed method, it is provided that a target specification for the drive voltage, and thus also a target phasing of the drive voltage, is determined by defining a zero phasing of the output signal. The essential information for regulation is the phase difference between the output signal of the oscillation sensor and the phasing of the drive current and, less so, the absolute variable of the drive voltage or the absolute variable of the drive current. If, in order to carry out the measuring tube oscillation in resonance, the calculation of a target specification for the drive voltage determinable and can be influenced by the controller, i.e., a complete target specification with amount and phase is successful, then such a target phasing of the drive voltage is automatically derived in order to generate resonance.

For determining a phase difference or, respectively, for the specification of the target phasing, it is easier if a zero phasing is provided by definition for the output signal of the oscillation sensor, i.e., the phase of the output signal is automatically set to zero, i.e., all other oscillation variables are related to the phasing of the output signal.

In a preferred implementation of the above-described further development of the method according to the invention for operating a Coriolis mass flowmeter, it is provided that the target specification $\underline{u}_{dr,sol}$ for the drive voltage $\underline{u}_{dr}$ is determined using the following equation:

$$\underline{u}_{dr,soll} = e^{-j\varphi_{idr}}(\underline{u}_{dr} - k_B \cdot u_s) + k_B \cdot u_s.$$

It should be explained here that $k_B$ is the mutual induction factor, which is an entirely real number. It is absolutely intended here that the output signal $u_s$ of the oscillation sensor is a real variable, i.e., not underlined, since all other variables are related to the phasing of the output signal $u_s$ defined to zero. The target phasing $\underline{u}_{dr,sol}$ and the electric excitation signal $\underline{u}_{dr}$ of the electromagnetic drive are—in the general case—phase-shifted variables, which have a phase shift to the output signal $u_s$ of the oscillation sensor, which is why it is also generally shown underlined here. This correlation will be described in the scope of the description of the figures.

It has been seen to be advantageous that the impedance $\underline{Z}_S$ of the drive coil is determined outside of resonance operation, in that the quotient of the drive voltage $\underline{u}_{dr}$ and the adjusting drive current $\underline{i}_{dr}$ is calculated, and the mutual induction factor $k_B$ is determined without taking the mutual induction voltage $\underline{u}_B$ at the drive coil into account, wherein the mesh equation for the network mesh is used here. This consists of the output of the electric actuating device and the electromagnetic driving mechanism with the drive coil. When the impedance $\underline{Z}_S$ of the drive coil is determined in this manner, it is particularly easy when the following relation with the impedance $\underline{Z}_S$ of the drive coil, the drive current $\underline{i}_{dr}$ and the output signal $u_s$ of the oscillation sensor is used for determining the mutual induction factor $k_B$ $$k_B = \frac{u_{dr} - \underline{Z}_S \cdot i_{dr}}{u_s}$$

It is evident that the determination of the target specification $\underline{u}_{dr,soll}$ for the drive voltage $u_{dr}$ occurs continuously, which is common for a normal sampling system with a controller. It can be ensured in this manner that a reaction is always possible even when there are changes in certain circumstances during operation of the Coriolis mass flowmeter and a changed resonance point is updated.

It may well be advantageous that the control mode in resonance is temporarily interrupted, the controller is provided another phasing specification as target value for the phasing $\varphi_{i_{dr}}$ of the drive current $\underline{i}_{dr}$ compared to the phasing $\varphi_s$ of the output signal $\underline{u}_s$ of the oscillation sensor. Such settings deviating from the normal operation can, for example, be used for system identification, for example, in order to determine phase-selective parameters, e.g., parameters from mathematical models of the Coriolis mass flowmeter, which are used for regulation.

The object of the invention is further achieved using a Coriolis mass flowmeter in that the above-described method is carried out in its various implementations, i.e., using a Coriolis mass flowmeter having at least one controller, at least one electric actuating device, at least one electromagnetic driving mechanism with a drive coil as oscillation generator, at least one measuring tube and at least one oscillation sensor, wherein the controller generates a controller output signal for controlling the electric actuating device, the electric actuating device provides an electric excitation signal for exciting the electromagnetic drive mechanism, the electromagnetic drive mechanism excites the measuring tube to oscillation in at least one eigenform and wherein the excited oscillation of the measuring tube is detected by the oscillation sensor and emitted as at least one output signal, wherein the electric actuating device impinges the drive coil of the electromagnetic driving mechanism with a drive voltage and a drive current so that the oscillation of the measuring tube occurs largely in resonance. The Coriolis mass flowmeter achieving the object is characterized in that, for achieving resonance operation, the output signal of the oscillation sensor is determined, the drive voltage at the drive coil is determined, the phasing of the drive current in relation to the phasing of the output signal of the oscillation sensor is determined and a new target phasing for the drive voltage is derived from the determined quantities and supplied to the controller so that the controller generates a drive voltage with the determined new target phasing via the electric actuating device.

Particularly advantageous designs of the Coriolis mass flowmeter are characterized in that, during operation, the Coriolis mass flowmeter carries out one of the above-described methods in its particular implementation.

In detail, there is a plurality of possibilities for designing and further developing the method and Coriolis mass flowmeter according to the invention as will be apparent from the following description of preferred embodiments in conjunction with the accompanying meeting drawings.

DETAILED DESCRIPTION OF THE INVENTION

Figure 1:
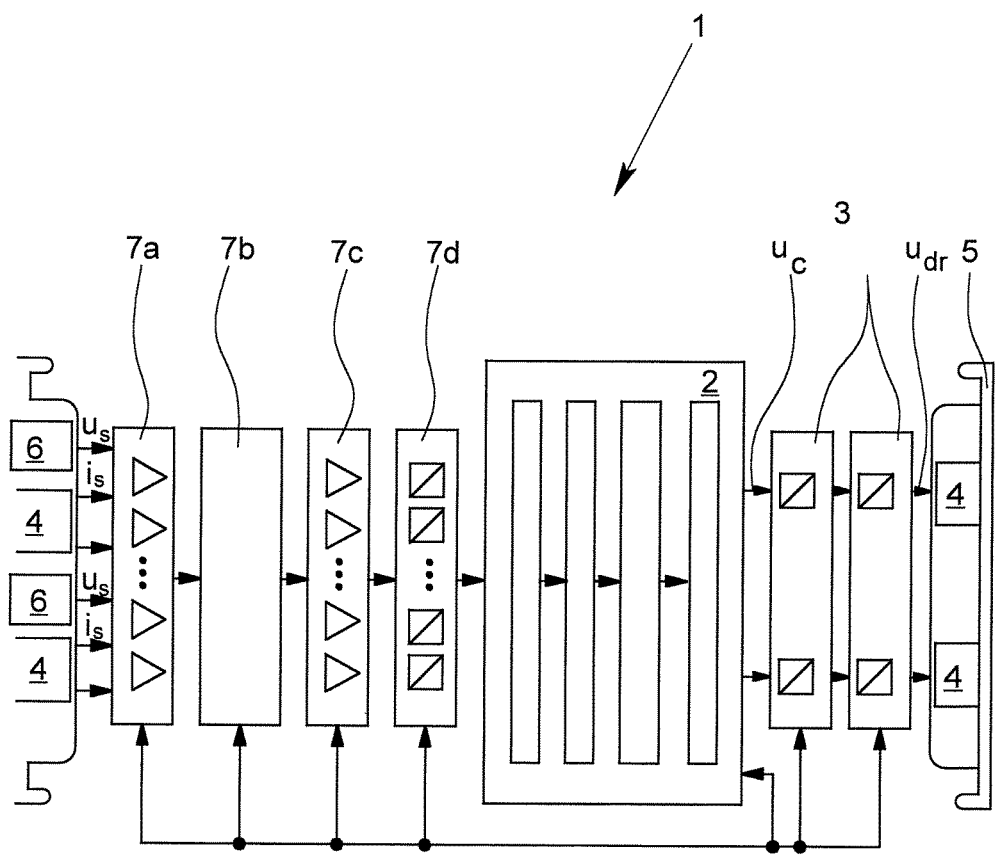
FIG. 1 schematically shows the structure of a Coriolis mass flowmeter as it is known from the prior art, but as it could be used for the method according to the invention and the Coriolis mass flowmeter according to the invention.

FIG. 1 shows a Coriolis mass flowmeter 1 with a controller 2 implemented in a digital signal processor, with an electric actuating device 3 and with an electromagnetic driving mechanism 4 having a drive coil as oscillation generator, not shown in detail in FIG. 1.

The Coriolis mass flowmeter 1 has a measuring tube 5. The electromagnetic driving mechanism 4 has the task of exciting the measuring tube 5 with medium flowing through it to an oscillation in an eigenform. Depending on the type of the eigenform, only one, single electromagnetic driving mechanism is required for this, if higher modes are able to be excited, then two or more electromagnetic driving mechanisms 4 are required.

The Coriolis mass flowmeter 1 is shown in two parts in FIG. 1. The one unit forming the Coriolis mass flowmeter 1 ends with one half at the right edge of the figure and begins, for a better overview, again with the other half at the left edge of the figure. It can be seen there that the Coriolis mass flowmeter 1 also has oscillation sensors 6 that each emit an output signal $\underline{u}_s$ presently in the form of a speed signal that provides information about the speed v of the movement of the measuring tube. The electric state variables are shown underlined here, in order to make clear that they are normally harmonic signals with a phasing, i.e., can be described as indicator variables. Thus, it is possible for electric state variables, which are shown without being underlined, to assume that they—for whatever reason—have a zero phasing, i.e. are mathematically real.

The controller 2 generates a controller output signal $\underline{u}_c$ for controlling the electric actuating device 3, and the electric actuating device 3 subsequently generates an electric excitation signal $\underline{u}_{dr}$ for exciting the electromagnetic driving mechanism 4. A plurality of transfer elements 7 are connected to the oscillation sensor 6, which are essentially used for signal preparation, such as, for example, adaptation electronics 7a consisting of amplifiers, a hardware multiplexer 7b for implementing different switchable measuring channels, a further adaptation electronics 7c and an analog-digital converter 7d that supplies the measured analog signals to the controller 2 in the form of digital signals. The exact execution of these transfer elements is not of importance, they are described here for the sake of completeness.

Figure 2:
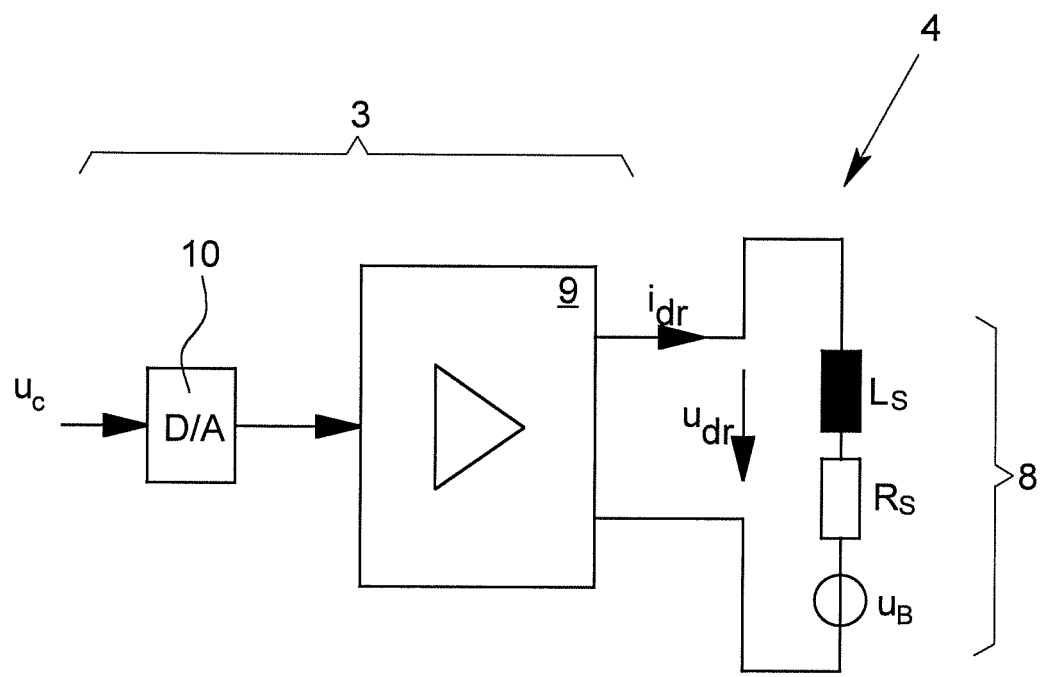
FIG. 2 is an equivalent circuit diagram of a coil comprised in an electronic driving mechanism with an electric actuating device and FIG. 3 is a block diagram showing the method according to the invention for operating a resonance measuring system.

In the prior art, the control loop implemented in this manner forms a phase locked loop and is based on either the imprinting of a current $\underline{i}_{dr}$ in a coil 8 of the electromagnetic driving mechanism 4 or the intrusion of an electric excitation signal in the form of an excitation voltage $\underline{u}_{dr}$ at the clamps of a coil 8 of the electromagnetic driving mechanism 4. This concept is depicted in FIG. 2 for clarification. The electromagnetic driving mechanism 4 has a drive coil 8 here, which, in the equivalent circuit diagram according to FIG. 2, has a coil inductance $L_s$ an ohmic resistance $R_s$ and a voltage source $\underline{u}_B$ induced proportional to speed. The controller, not shown in FIG. 2, supplies the controller output signal $\underline{u}_c$ for controlling the further electric actuating device 3, comprised of a controllable energy source 9 and a digital-analog converter. The controllable energy source 9 is either a voltage-controlled current source or, however, a voltage-controlled voltage source, wherein both solutions have different advantages and disadvantages relating to the particular characteristics of the coil 8, for example, that stepped changes in current lead to significant changes in the clamp voltages.

In the electromagnetic driving mechanism 4, which, as depicted in FIG. 2, has a coil 8, the coil current $\underline{i}_{dr}$ is of particular importance, because the coil current $i_{dr}$ is the state variable of the electromagnetic driving mechanism 4 that is proportional to the force of the electromagnetic driving mechanism 4 on the measuring tube 5. In the case of a Coriolis mass flowmeter 1, the phase difference, in resonance, between the force F acting on the oscillation element 5 and thus between the coil current $i_{dr}$ and the detected speed v of the measuring tube movement is zero. The speed v of the measuring tube movement thereby corresponds or, respectively, is proportional to the detected output voltage $u_s$ of the oscillation sensor 6. The movement of the measuring tube 5, however, not only influences the oscillation sensor 6, in fact, it is also a retroactive effect on the oscillation generator in the form of the drive coil 8 since the movement of the measuring tube 5 leads to a corresponding movement of a normally-present permanent magnet in the drive coil 8, which itself generates the mutual induction voltage $u_B$.

The following holds true in the interstices formed from the output clamps of the actuating device 3 and the clamps of the coil 8 attached thereto $$\underline{u}_{dr} = \underline{Z}_S \cdot \underline{i}_{dr} + \underline{u}_B \tag{1}$$

The challenge during operation of a Coriolis mass flowmeter 1 is to control the electric actuating device 3 using the controller 2 so that the drive coil 8 of the electromagnetic drive mechanism 4 is impinged with a drive voltage $\underline{u}_{dr}$ and a drive current $\underline{i}_d$ so that the oscillation of the measuring tube 5 occurs largely in resonance. "Largely in resonance" thereby takes into account that the resonance point is a strictly defined exact state of the system, which mathematically in practice can never be exactly achieved, but is always only as exact as is technically possible and permitted by the implemented regulation, i.e., what is meant is the resonance operation is as close to the resonance point as is permitted by the implemented technical solution.

Figure 3:
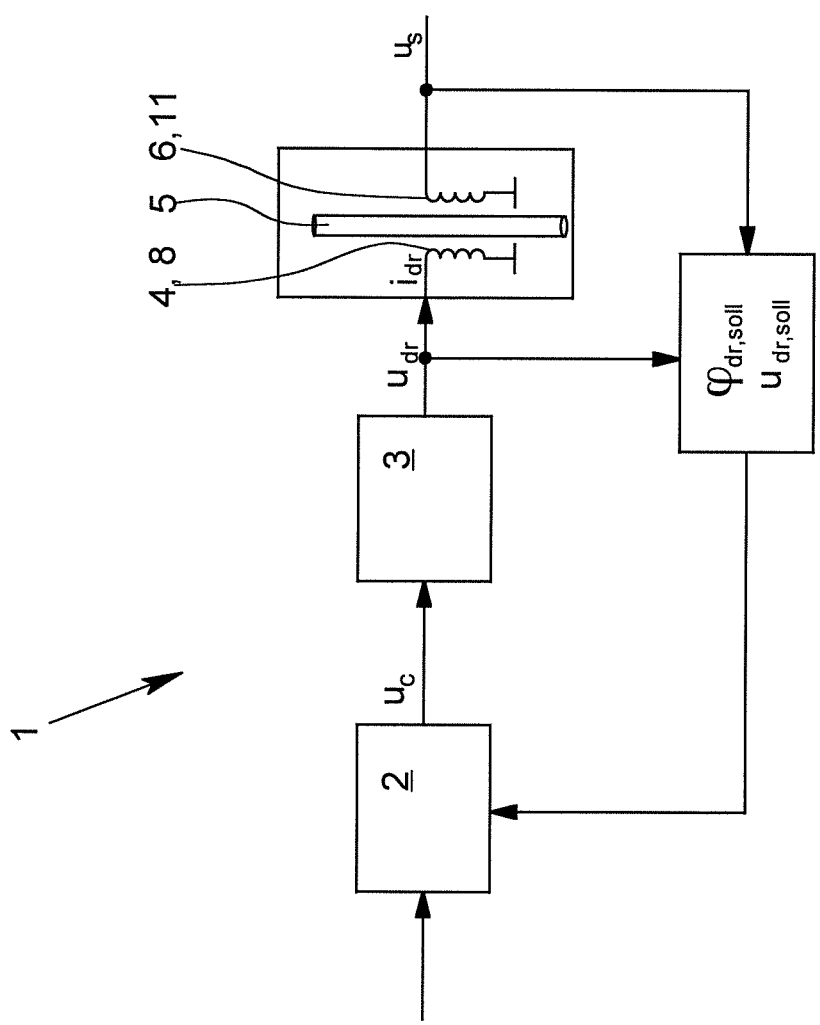

The method for operating the Coriolis mass flowmeter 1 is shown in FIG. 3, namely shown in the form of a block diagram. The controller 2 controls the electric actuating device 4 via the controller output signal $\underline{u}_c$, wherein the electric actuating device 3 controls the electromagnetic driving mechanism 4 by emitting the electric excitation signal $\underline{u}_{dr}$, the driving mechanism as oscillation generator deflecting the measuring tube 5. The electromagnetic driving mechanism 4 consists of a schematically depicted coil 8 with a permanent magnet as core, wherein the non-depicted permanent magnet carries out a movement when supplying the coil 8 with current and, in this manner, is able to excite the measuring tube 5 to oscillation. The oscillation of the measuring tube 5 is detected by the oscillation sensor, which, in the present case, is also a permanent magnet and has a coil 11, wherein the voltage $\underline{u}_s$ induced in the coil 11 is used for evaluating the change of position of the measuring tube 5. The speed signal is thus present as an output signal $\underline{u}_s$ of the oscillation sensor 6.

According to the invention, it is now intended, in order to achieve resonance operation, to determine the output signal us of the oscillation sensor, to determine the drive voltage $\underline{u}_{dr}$ at the drive coil 8, to determine the phasing $\varphi_{idr}$ of the drive current $\underline{i}_{dr}$ compared to the phasing $\varphi_s$ of the output signal $\underline{u}_s$ of the oscillation sensor 6 and to derive a new target phasing $\varphi_{idr,soll}$ for the drive voltage $\underline{u}_{dr}$ from the derived variables and to supply them to the controller 2, so that the controller 2 generates a drive voltage $\underline{u}_{dr}$ with the newly derived target phasing $\varphi_{dr,soll}$ via the electric actuating device 3.

The method is based on the consideration that the phase difference between the force F on the measuring tube and the resulting measuring tube speed v is to be regulated to zero when possible, wherein this phase difference also corresponds to the phase difference between the coil current $i_{dr}$ and the measuring tube speed v or, respectively, the induced mutual induction voltage $\underline{u}_B$. This simultaneously corresponds to the phase difference between the coil current $i_{dr}$ and the phasing of the output signal $\underline{u}_s$ of the oscillation sensor 6, i.e.:

$$\Delta\varphi(\underline{F}, \underline{v}) = \Delta\varphi(i_{dr}, u_B) = \Delta\varphi(i_{dr}, u_s) = 0. \tag{2}$$

The electric excitation signal $\underline{u}_{dr}$, for exciting the electromagnetic driving mechanism, thus, has to be chosen so that the above-mentioned resonance requirements are met. Thereby, the mutual induction voltage $\underline{u}_B$ is to be in phase with the output voltage $\underline{u}_s$ of the oscillation sensor 6, accordingly:

$$\underline{u}_B = k_B \cdot \underline{u}_s. \tag{3}$$

Under this stipulation, the mesh equation can also be written as:

$$\underline{u}_{dr} = \underline{Z}_S \cdot \underline{i}_{dr} + k_B \cdot \underline{u}_s \tag{4}$$

The notation and calculation is particularly simple when the phasing of the output signal $\underline{u}_s$ is defined as zero phasing, i.e., $\varphi_s = 0$. Under this stipulation, the simplified equation (4) can also be written as follows:

$$\underline{u}_{dr} = \underline{Z}_S \cdot |\underline{i}_{dr}| e^{-j\varphi_{idr}} + k_B \cdot u_s \tag{5}$$

Since, under these requirements, i.e., in the case of resonance, it holds true that the phasing $\varphi_{idr}$ of the drive current $\underline{i}_{dr}$ is equal to zero, a target specification $\underline{u}_{dr,soll}$ for the drive voltage $\underline{u}_{dr}$, when the specification is correctly chosen, is:

$$\underline{u}_{dr,soll} = \underline{Z}_S \cdot |\underline{i}_{dr}| + k_B \cdot u_s \tag{6}$$

Thereby, after solving the mesh equation established above in the actual state and the target state, the drive current $\underline{i}_{dr}$ is:

$$i_{dr} = |i_{dr}| e^{-j\varphi_{idr}} = \frac{(\underline{u}_{dr} - k_B \cdot u_s)}{\underline{Z}_S} \tag{7}$$

$$i_{dr} = |i_{dr}| = \frac{(\underline{u}_{dr,soll} - k_B \cdot u_s)}{\underline{Z}_S}$$

If the actual state and the target state are compared to one another in terms of equations, then:

$$\frac{|i_{dr}| e^{-j\varphi_{idr}}}{|i_{dr}|} = \frac{\underline{u}_{dr} - k_B \cdot u_s}{\underline{u}_{dr,soll} - k_B \cdot u_s} \tag{8}$$

Thereby, for the drive voltage $\underline{u}_{dr}$, the target specification $\underline{u}_{dr,soll}$ is:

$$\underline{u}_{dr,soll} = e^{-j\varphi_{idr}}(\underline{u}_{dr} - k_B \cdot u_s) + k_B \cdot u_s \tag{9}$$

Thus, it makes sense to redetermine the target specification $\underline{u}_{dr,soll}$ for the drive voltage $\underline{u}_{dr}$ according to the above equation. When this is done continuously—which is common for a control technology sampling system—the Coriolis mass flowmeter 1 can also be kept in resonance operation, when the resonance point—for whatever reason—drifts during operation.

The shown correlation requires that the mutual induction factor $k_B$ is known. The mutual induction factor can be comparably easily determined according to an advantageous further development of the method according to the invention. For this, it is intended that the impedance $\underline{Z}_S$ of the drive coil 8 is determined outside of resonance operation of the Coriolis mass flowmeter 1, in that the quotient of the drive voltage $\underline{u}_{dr}$ and the adjusting drive current $\underline{i}_{dr}$ is calculated, and the mutual induction factor $k_B$ is determined without taking the mutual induction voltage $\underline{u}_B$ at the drive coil 8 into account—which is permitted in this case—. The determination takes place using the mesh equation for the network mesh, which consists of the output of the electric actuating device 3 and the electromagnetic driving mechanism 4 with the drive coil 8. When the measuring tube 5 is excited to oscillation outside of resonance, the mutual induction voltage $\underline{u}_B$ can be neglected, so that the impedance can be easily calculated from the mesh equation:

$$\underline{Z}_S = \frac{\underline{u}_{dr}}{\underline{i}_{dr}}. \tag{10}$$

However, when the impedance $\underline{Z}_s$ is known, the mutual induction factor $k_B$ can be easily calculated with:

$$k_B = \frac{\underline{u}_{dr} - \underline{Z}_S \cdot \underline{i}_{dr}}{\underline{u}_S}. \tag{11}$$

The method depicted is implemented by the Coriolis mass flowmeter 1 in the controller 2, so that, during operation, the Coriolis mass flowmeter 1 carries out the shown variations of the method for operating a Coriolis mass flowmeter 1.

What is claimed is:

1. Method for operating a Coriolis mass flowmeter having at least one controller, at least one electric actuating device, at least one electromagnetic driving mechanism with a drive coil as an oscillation generator, at least one measuring tube and at least one oscillation sensor, the method comprising the following steps:
    generating a controller output signal $\underline{u}_c$ for controlling the at least one electric actuating device with the at least one controller,
    providing an electric excitation signal $\underline{u}_{dr}$ for exciting the at least one electromagnetic drive mechanism with the at least one electric actuating device,
    exciting the at least one measuring tube to oscillation in at least one eigenform with the at least one electromagnetic drive mechanism,
    detecting excited oscillation of the measuring tube with the at least one oscillation sensor and emitting the detected oscillation as at least one output signal $\underline{u}_s$,
    applying a drive voltage $\underline{u}_{dr}$ and a drive current $\underline{i}_{dr}$ to the drive coil of the at least one electromagnetic driving mechanism with the at least one electric actuating device so that the oscillation of the measuring tube occurs largely in resonance,
    determining a target specification $\underline{u}_{dr,soll}$ for the drive voltage $\underline{u}_{dr}$, and thus also a target phasing $\varphi_{dr,soll}$ of the drive voltage $\underline{u}_{dr}$, by defining a zero phasing ($\varphi_s=0$) of the output signal $\underline{u}_s$ and
    determining the target specification $\underline{u}_{dr,soll}$ for the drive voltage $\underline{u}_{dr}$ using the equation $$\underline{u}_{dr,soll} = e^{-j\varphi_{idr}}(\underline{u}_{dr} - K_B \cdot \underline{u}_s) + k_B \cdot \underline{u}_s$$

wherein $k_B$ is a real number mutual induction factor, determining the output signal $\underline{u}_s$ of the at least one oscillation sensor,
    determining the drive voltage $\underline{u}_{dr}$ at the drive coil,
    determining phasing $\varphi_{idr}$ of the drive current $\underline{i}_{dr}$ in relation to phasing $\varphi_s$ of the output signal $\underline{u}_s$ of the oscillation sensor, and
    deriving a new target phasing $\varphi_{dr,soll}$ for the drive voltage $\underline{u}_{dr}$ based on the determinations and supplying the new target phasing to the at least one controller,
    using the at least one controller for generating a drive voltage $\underline{u}_{dr}$ with the determined new target phasing ($\varphi_{dr,soll}$) via the electric actuating device so that the at least one controller produces resonance operation of the flowmeter.

2. The method for operating a Coriolis mass flowmeter according to claim 1, wherein the impedance $\underline{Z}_S$ of the drive coil is determined outside of resonance operation, wherein a quotient of the drive voltage and an adjusting drive current $\underline{i}_{dr}$ is calculated, and the mutual induction factor $k_B$ is determined without taking the mutual induction voltage $\underline{u}_B$ at the drive coil into account using measuring equation for a measuring network of the output of the electric actuating device and the electromagnetic driving mechanism with the drive coil.

3. The method for operating a Coriolis mass flowmeter according to claim 2, characterized in that, in order to determine the mutual induction factor $k_B$, the following relation is used with the impedance $\underline{Z}_S$ of the drive coil, the drive current $\underline{i}_{dr}$ and the output signal $\underline{u}_s$ of the oscillation sensor $$k_B = \frac{\underline{u}_{dr} - \underline{Z}_S \cdot \underline{i}_{dr}}{\underline{u}_S}.$$

4. The method for operating a Coriolis mass flowmeter according to claim 1, wherein a control mode in resonance is temporarily interrupted, wherein the controller is provided another phasing specification as a target value for the phasing of the drive current $\underline{i}_{dr}$ corresponds to a phase difference of +−45° as compared to the phasing of the output signal $\underline{u}_s$.

5. A Coriolis mass flowmeter, comprising:
    at least one controller,
    at least one electric actuating device,
    at least one electromagnetic driving mechanism with a drive coil as oscillation generator,
    at least one measuring tube, and
    at least one oscillation sensor,
    wherein the at least one controller is adapted for generating a controller output signal $\underline{u}_c$ for controlling the at least one electric actuating device,
    wherein the at least one electric actuating device is adapted to provide an electric excitation signal $\underline{u}_{dr}$ for exciting the at least one electromagnetic drive mechanism,
    wherein the at least one electromagnetic drive mechanism is adapted for exciting the measuring tube to oscillation in at least one eigenform,
    wherein the at least one oscillation sensor is adapted for detecting excited oscillation of the measuring tube and emitting as at least one output signal $\underline{u}_s$ based thereon,
    wherein the at least one electric actuating device is adapted to apply a drive voltage $\underline{u}_{dr}$ and a drive current $\underline{i}_{dr}$ to the drive coil of the at least one electromagnetic driving mechanism so that the oscillation of the measuring tube occurs largely in resonance, wherein a target specification $\underline{u}_{dr,soll}$ for the drive voltage $\underline{u}_{dr}$, and thus also a target phasing $\varphi_{dr,soll}$ of the drive voltage $\underline{u}_{dr}$, is determined by defining a zero phasing ($\varphi_s=0$) of the output signal $\underline{u}_s$ and wherein the target specification $\underline{u}_{dr,soll}$ for the drive voltage $\underline{u}_{dr}$ is determined using the equation $$\underline{u}_{dr,soll} = e^{-j\varphi_{idr}}(\underline{u}_{dr} - K_B \cdot u_s) + k_B \cdot u_s$$

wherein a mutual induction factor $k_B$ is a real number, further comprising means for determining the output signal $\underline{u}_s$ of the at least one oscillation sensor, the drive voltage $\underline{u}_{dr}$ at the drive coil, phasing $\varphi_{idr}$ of the drive current $\underline{i}_{dr}$ in relation to phasing $\varphi_s$ of the output signal $\underline{u}_s$ of the oscillation sensor, and for setting a new target phasing $\varphi_{dr,soll}$ for the drive voltage $\underline{u}_{dr}$ derived from the determinations and for supplying the new target phasing $\varphi_{dr,soll}$ to the controller, and wherein the controller is adapted for generating a drive voltage $\underline{u}_{dr}$ with the new target phasing $\varphi_{dr,soll}$ via the electric actuating device by which operation in resonance is achieved.

* * * * *